United States Patent [19]
Champleboux et al.

[11] 3,899,006
[45] Aug. 12, 1975

[54] TUBES PROVIDED WITH CONNECTING FLANGES

[75] Inventors: Jacques Champleboux; Robert Delaux, both of Clermont-Ferrand, France

[73] Assignee: Pneumatiques, Caoutchouc Manufacture et Plastiques Kleber-Colombes, France

[22] Filed: Mar. 29, 1972

[21] Appl. No.: 239,193

[30] Foreign Application Priority Data
Mar. 29, 1971  France .............................. 71.11034

[52] U.S. Cl. ................................ 138/109; 285/149
[51] Int. Cl. ............................................... G01l 11/12
[58] Field of Search ............ 138/109, 130, 137, 143, 138/144, 147, 153, 174, 175, 172; 285/149, 288, 405, 416

[56] References Cited
UNITED STATES PATENTS
1,156,332  10/1915  Vaughn.......................... 138/172 X
2,298,738  10/1942  Kimmich et al. ............... 285/149 X
3,453,008  7/1969   Lejeune ............................. 285/149
3,584,657  6/1971   Dorr et al. ...................... 138/143 X
3,596,681  8/1971   Elson ................................. 138/109

*Primary Examiner*—Charles A. Ruehl
*Attorney, Agent, or Firm*—Craig & Antonelli

[57] ABSTRACT

A pipe of rubber or analogous material provided with a coupling flange which is constituted by one or several metallic rings secured to the pipe reinforcement, in which the ring is constituted by at least a series of concentric windings of a metallic element wound along spirals superposed one upon the other and firmly joined to one another; the method in accordance with the present invention consists of winding the metallic element in consecutive turns along spirals one upon the other, firmly connecting together the wound assembly and installing the same on the tubular member to form an integral part thereof.

22 Claims, 14 Drawing Figures

FIG.1
FIG.3
FIG.3a
FIG.2
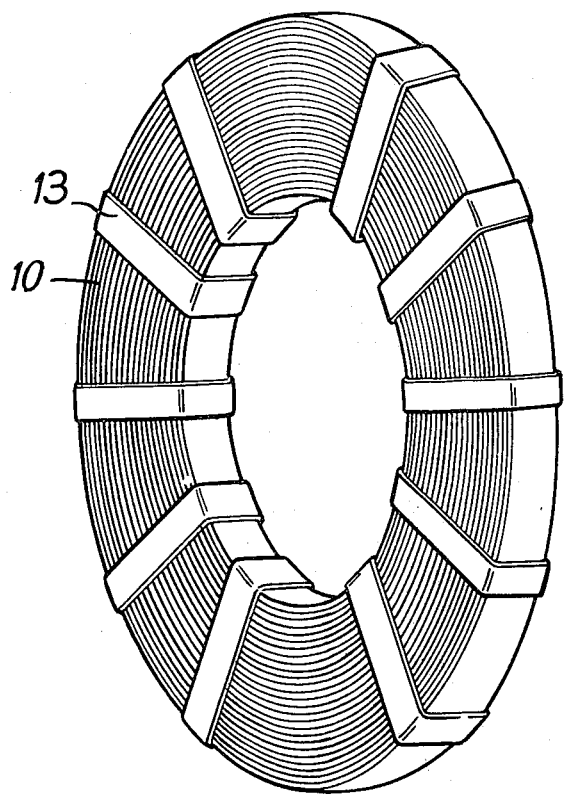
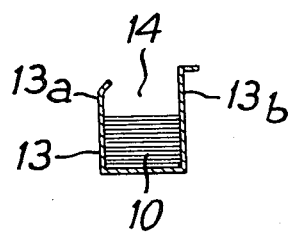
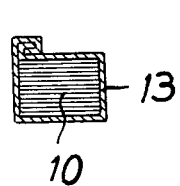
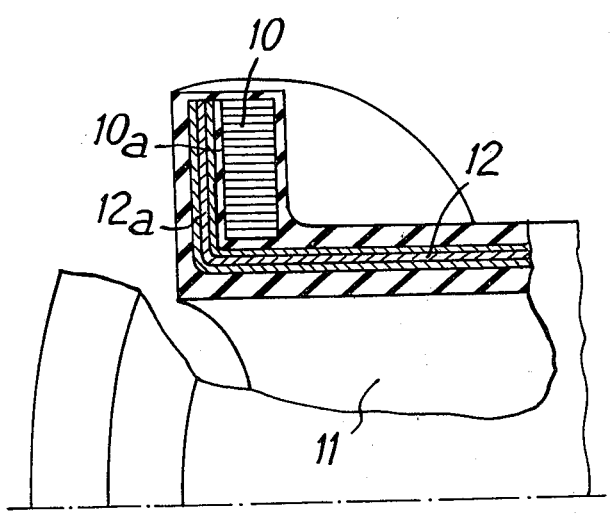

PATENTED AUG 12 1975  3,899,006

SHEET 3

TUBES PROVIDED WITH CONNECTING FLANGES

The present invention relates to tubes or pipes of rubber or analogous material, which are reinforced and provided with flanges of the integral or unitary type, that is flanges embedded in the wall of these tubes or pipes.

Up to the present one has utilized various flanges which exist either in the form, as very widely distributed, of a ring eventually extended by a neck or tubulure coaxial to the tube or pipe, the ring and the neck being realized in a single metallic block, or in the form of two or several closed metallic rings having a different diameter in order to be concentric as described in the British Pat. Specification No. 895,551.

However, these prior art coupling flanges entail numerous inconveniences and shortcomings such as, for example, those due to the fact that they require the realization, by machining, of elements to the dimensions of each of the types of the pipes; in effect, this entails, on the one hand, an important cost of manufacture of the flanges and, on the other, long stocking delays thereof.

Moreover, the external forces which are exerted on these flanges, cause permanent deformations since the flanges do not possess any elasticity which permits the same to reassume their initial shape.

The present invention has as its object tubes or pipes of rubber or analogous material provided with integral flanges whose manufacture is more simple and less costly than those of the presently existing flanges; the present invention has also as its object flanges which reassume their initial shape after having been deformed, for example, by shocks or impacts of any nature.

In effect, with the tubes or pipes which are provided with flanges constituted by one or several rings formed by a metallic band wound on itself along several concentric, superposed spirals which are firmly joined to one another, it is no longer necessary to preliminarily machine each of the flanges since in a simple operation, it suffices to wind a band of metallic sheet or hooping material on itself; the manufacture of these pipes is easy for, as will be seen more fully hereinafter, one can realize these rings by winding the hoop material on the tube in the course of its manufature; finally, by reason of their elasticity, the flanges, with which the tubes or pipes of the present invention are provided, reassume their initial shape after they have been deformed by external forces.

Another advantage of the present invention resides in the fact that the tubes or pipes of the present invention may be connected by the different methods of connection as generally utilized at present; one may, for example, realize pipes of the present invention which are connected by bolts or pipes which will be conncected by an external device such as a ring clamp or the like, which applies the two extremities against one another.

The pipes of the present invention may be manufactured like the pipes with flanges as exist at present; onto the pipes in the course of their manufacture on a mandrel, after their casing and their reinforcement have been laid, one places the rings, one flanges the reinforcment against the external face of the latter, one covers the rings with a layer of rubber, one emplaces their cover, one encloses the flanges between molding plates, one girths or straps the body of the pipes and then one vulcanizes the same.

One may also realize the rings directly on the pipes in the course of their manufacture by winding on itself the ribbon of metallic hooping material onto their reinforcement.

In the pipes of the present invention the ring is generally fixed to the reinforcement only by a relatively thin layer of rubber which adheres simultaneously to the one as well as to the other; this adherence which must be excellent and preferably superior to the resistance of the rubber, is obtained by conventional means well known to a person skilled in the art and independent of the present invention, consisting, for example, in associating a mixture of rubber of particular composition, a so-called gluing or bonding rubber of known type, with an appropriate treatment of the reinforcment and of the ring. One may, for example, coat the preliminarily treated ring with a bonding rubber layer which will assure the adherence with the rubber within which the reinforcement is embedded (and which may be the same rubber if the reinforcement is metallic), and with the rubber of the cover of the ring.

These and other objects, features and advantages of the present invention will become more apparent from the following description when taken in conjunction with the accompanying drawing which shows, for purposes of illustration only, several embodiments in accordance with the present invention, and wherein:

FIG. 1 is a perspective view of a ring which permits the realization of a coupling flange of a pipe in accordance with the present invention;

FIG. 2 is a partial perspective view, broken away, of one end of the pipe in accordance with the present invention, in which the flange is constituted by the ring of FIG. 1;

FIGS. 3 and 3a are cross sectional views of the ring of FIG. 1 in the course of the manufacture thereof;

Figure 4:
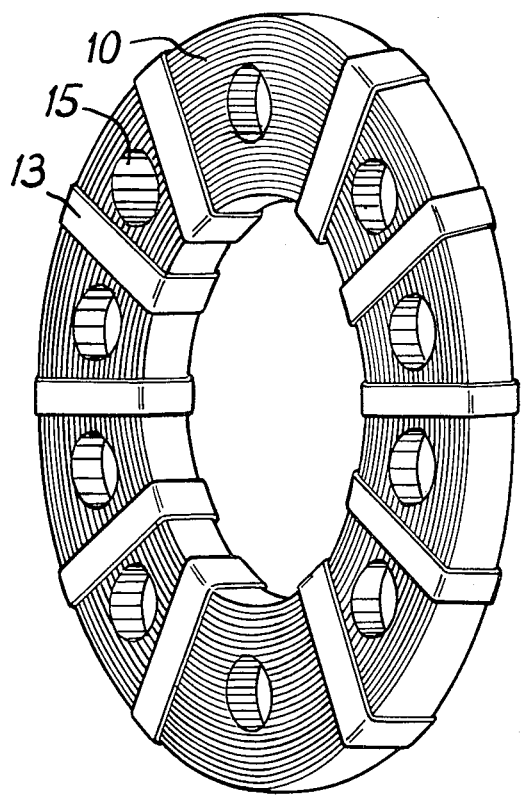
FIG. 4 is a perspective view of a modified embodiment of a ring which may also be used in the pipes of the present invention and which is provided with holes with a view to permit a connection by means of bolts.

Referring now to the drawing wherein like reference numerals are used throughout the various views to designate like parts, and more particularly to FIG. 1, the ring 10 of this figure which constitutes the flange of the tube or pipe 11 of FIG. 2 is realized by winding on itself and under tension, along joined concentric spirals, a metallic hoop material or metallic band of high elasticity and mechanical resistance until one obtains the necessary thickness in order that the ring has the desired resistance. The spirals, which impart to the ring a sheeted, stacked appearance, are joined with one another; they may be joined by different known means, for example, by gluing or bonding one to the other but preferably, as in the described embodiments, one utilizes clamps or straps 13, placed along radial planes, which surround the section of the ring and which are equally distributed over the entire pereiphery of the ring.

As can be seen from FIGS. 3 and 3a, one introduces the metallic ribbon, as it is being wound, into the clamps 13, for example, of tempered and copper-plated steel, which are uniformly distributed over a circumference corresponding to the interior circle of the ring; the clamps 13 are in the shape of a U whose openingg 14 is directed toward the outside; the lateral walls 13a and 13b of the clamp, separated from one another by a distance equal to the width of the band, guide the hooping band while being wound, in such a manner that the spirals are exactly superposed on one another.

When the number of spirals is sufficient, one closes the clamps 13 by flanging over the two free ends of the lateral walls 13a and 13b of which the length is sufficient to permit a complete closing of the clamp or strap; preferably, to maintain the windings firmly applied one against the other, one realizes a crimping as shown in FIG. 3a.

The ring of FIG. 1 may be made independently of the tube and may be installed during the manufacture of the latter; however, the ring of FIG. 1 may also be made directly on the tube itself in the course of its manufacture.

Thus, during the manufacture of the tube of FIG. 2 having an internal diameter of 600 mm, one has realized the ring 10, with an internal diameter of 650 mm, and with an external diameter of 775 mm, by placing, on the reinforcment 12, 10 open clamps, approximately 15 mm in width, of tempered steel uniformly distributed over the circumference. Thereafter, a band having a thickness of 0.8 mm and a width of 15 mm made of drawn steel having a resistane of 200 kg/mm$^2$ a thickness of 62.5 mm; the clamps 13 are thereafter crimped as shown in FIG. 3a. It should be noted that a ring with this thickness (62.5 mm), even though formed by approximately 78 windings, is simple to realize when the tube or pipe is in the course of its manufacture on its drum or wheel; it suffices in effect to place a roller of hoop material, eventually provided with a braking device, near the tube in such a manner that, by setting into operation the manufacturing drum or wheel or the tube, the hooping material, such as the metallic band will unwind from its roller to wind onto the tube while forming the ring. After the ring 10 has been covered with a layer of adhesive or bonding rubber, the free portion 12a of the reinforcment 12 which extends beyond the stacked ring 10, is flanged over against the external face 10a thereof, and one terminates the manufacture of the tube by emplacing the cover of the tube and by placing a rubber layer on the portion 12a of the reinforcement and on the upper and lower faces of the ring 10; thereafter, after having installed two tightening cheeks compressing the flanges and after having girthed or strapped the body of the tube, one vulcanizes the assembly in the usual manner.

The pipe which has been described is connected to another pipe by conventional means, independent of the present invention, of the type which, such as clamps, maintain the two flanges by an external tightening action.

One may also provide in the ring holes intended to permit the passage therethrough of tightening bolts; even though the ring described above is composed of superposed, stacked layers, the piercing of these holes is perfectly realizable by reason of the fact of the good stability of the windings of hoop material among each other due to the fixing clamps or straps which impart a sufficient rigidity to the assembly; nevertheless, preferably tungsten carbide drills will be utilized which permit a more ready attack of the edges of the stacked assembly. The flange may then be realized advantageously in such a manner that at least one clamp exists between two consecutive holes, and even two or three clamps exist between consecutive holes if the flange is to be subjected to significant forces.

Figure 5:
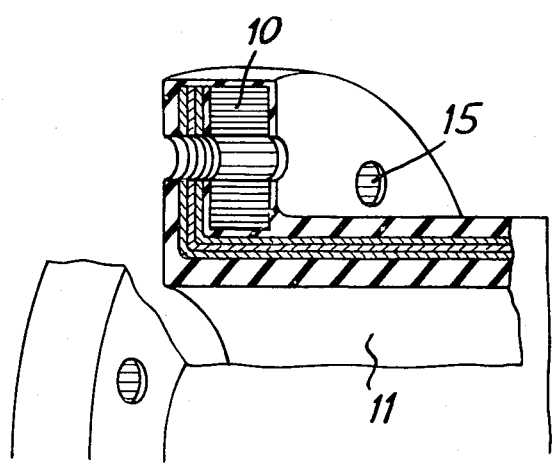
FIG. 5 is a partial perspective view, broken away, of one end of the pipe in accordance with the present invention, whose flange is constituted by the ring of FIG. 4.

This type of construction is illustrated in FIGS. 4 and 5, in which, in a ring 10 identical to that of FIG. 1, holes 15 have been made permitting the passage therethrough of tightening bolts, and more particularly, one hole 15 between each two adjacent clamps 13. To realize a pipe provided with flanges of this type, it is preferable to make the ring separately and to place the completely manufactured ring, that is, with the holes pierced therethrough, onto the tube in the course of its manufacture, and to place into the holes 15 of the ring, metallic cylinders of the same diameter as the holes, which extend on both sides of the ring and which, intended to prevent the closing of the holes by the rubber, are withdrawn after vulcanization or left in place; the reinforcement is divided into bundless corresponding to the intervals between the holes and is thereafter flanged over by seeing to it that its elements avoid the holes; the manufacture of the pipe is terminated and the vulcanization is then carried out in the usual manner.

The connection of pipes provided with such flanges takes place in the usual manner by means of bolts and nuts.

Figure 7:
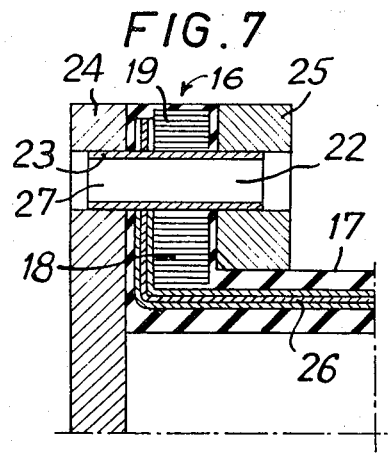
FIG. 7 is a partial cross sectional view of one half of a pipe in the course of its manufacture provided with a flange constituted by the concentric rings of FIG. 6.
Figure 6:
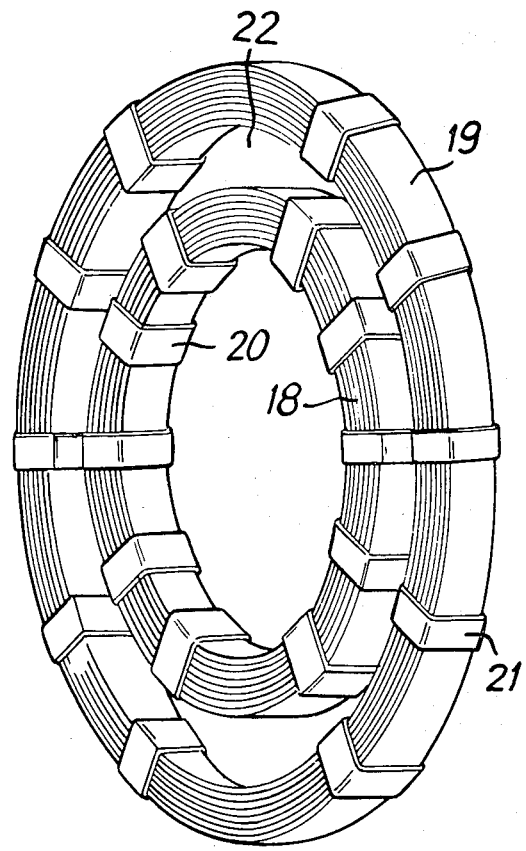
FIG. 6 is a perspective view of two concentric rings constituting another pipe coupling flange according to the present invention.

The flange generally designated by reference numeral 16 of the pipe 17 (FIGS. 6 and 7) is constituted by two concentric rings 18 and 19, analogous to the ring of FIG. 1 and formed by adjacent joined spirals of a metallic band maintained applied against one another by means of clamps or straps 20 and 21, uniformly distributed. The external diameter of the ring 18 is smaller than the internal diameter of the ring 19 in such a manner that they are separated by a distance approximately equal to the diameter of the tightening bolts which will be used; thus, there exists a space 22 between the two rings 18 and 19. These two rings 18 and 19 may be realized independently of one another, each being constituted by a hoop material, or they may be realized without interruption of the hoop material by proceeding with the clamping of the first ring 18 before realizing the other ring 19.

During the manufacture of the pipes provided with flanges of this type, one manufactures the ring 18, one places a layer of crude rubber corresponding to the space 22 which is traversed by tubes 23 of a length equal to or greater than the length of the flange, corresponding to the passages of the connecting bolts, one installs the ring 19, one flanges over the reinforcement as described previously, one terminates the manufacture of the tube and one proceeds with vulcanization after having strapped the pipe and after having installed the molding cheeks 24 and 25 provided with openings 27 through which pass the tubes 23; after vulcanization the tubes 23 are withdrawn or they are cut substantially to the length of the flange to leave the same in place. The connection of pipes provided with this type of flanges takes place by bolts and nuts; nevertheless, in order to exert the same force on the rings 18 and 19, one utilizes bolts with a large head, with possible interposition of washers.

One has thus realized a pipe provided with a flange of the type having an internal diameter of 600 mm; the two concentric rings realized from the same hooping material as previously have 20 mm and 10 mm thickness and were spaced from each other by a distance of 32.5 mm.

Figure 8:
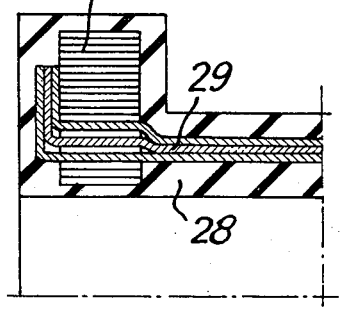
FIG. 8 is a partial cross sectional view of one half of another pipe in accordance with the present invention.

The flange of the pipe 28 of FIG. 8 also comprises a ring 47 constituted by concentric hoop windings; it was realized at the same time as the reinforcement 29 which finds itself enclosed between two successive spirals; thus the reinforcement is anchored within the ring and the mechanical effects of this anchoring arrangement are added to those of the adhesion which exists between the reinforcement and the external face of the ring.

Figure 11:
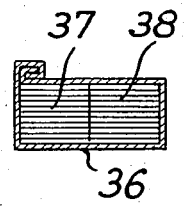
FIG. 11 is a transverse cross sectional view of a ring utilized in still another pipe of the present invention.
Figure 9:
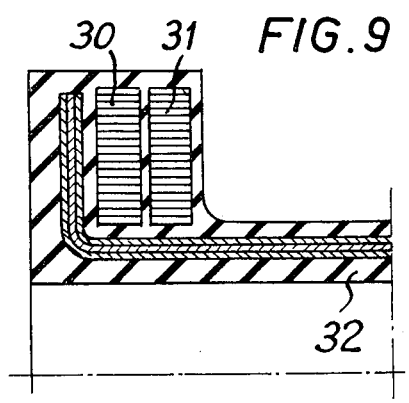
FIG. 9 is a partial cross sectional view of one half of a still further modified embodiment of a pipe in accordance with the present invention.
Figure 10:
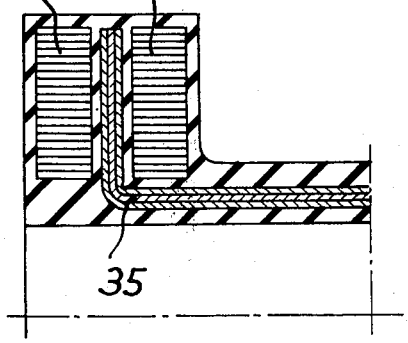
FIG. 10 is a partial cross sectional view of one half of one end of a further modified pipe in accordance with the present invention.

FIGS. 9, 10, and 11 illustrate other embodiments of pipes in accordance with the present invention. The flanges of these pipes comprise two stacked rings; they are either directly juxtaposed as the rings 30 and 31 of the pipe 32 of FIG. 9 whose reinforcement is flanged over against the free end of the external ring 30, or placed on both sides of the reinforcement as the rings 33 and 34 of the pipe of FIG. 10 which sandwiches therebetween the reinforcement 35. In the embodiment of FIG. 9, the reinforcment could be locked in and tightened between two successive spirals of these rings as in the embodiment of FIG. 8. It could be the same insofar as the ring 34 and the reinforcement 35 of the pipe of FIG. 10 are concerned.

The rings of FIGS. 9 and 10 may be clamped or strapped separately as in the previous embodiments; however, as this is particularly illustrated in FIG. 11, one can also juxtapose two rings 37 and 38 and crimp common clamps 36 which simultaneously maintain the spirals of each of the rings applied one against the other and which firmly join one ring against the other. These common clamps may advantageously complete the tightening in sandwich form of the reinforcement of the tube of FIG. 10.

Figure 12:
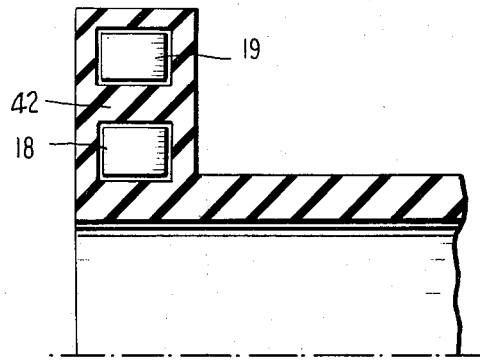
FIGS. 12 and 13 are partial cross sectional views of one half of further modified embodiments of a pipe in accordance with the present invention.
Figure 13:
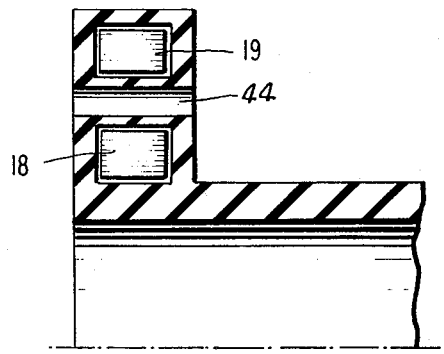

The flange of FIG. 12 is constituted by two concentric rings 18, 19 separated by an annular layer of elastic material 42. As shown in FIG. 13 axial holes 44 may be provided in the annular layer of elastic material for the passage therethrough of connecting bolts.

When two pipes provided with flanges of the present invention are connected either by bolts or by external ring clamps, their connection exhibits good performances. One has for example noted that two pipes of 200 mm in diameter connected by flanges according to the present invention had presented a perfect tightness at 35 bars.

On the other hand, the connections of tubes or pipes according to the present invention resist better to shocks and impacts and, in a general manner, to all external forces; this is without doubt due to the elasticity of the rings constituted by a metallic hoop.

While we have shown and described several embodiments in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

What we claim is:

1. A pipe of rubber or analogous material having a reinforcement means provided therein and coupling flange means constituted by at least one ring means connected to the reinforcement means of the pipe, characterized in that the ring means is constituted by at least one series of concentric windings of a ribbon-like element wound along spirals superposed one upon the other and firmly joined with one another.

2. A pipe according to claim 1, characterized in that the ribbon-like element is metallic.

3. A pipe according to claim 2, characterized in that the reinforcement means includes a flange portion, said flange portion is disposed adjacent a face of the ring means and is connected thereto by way of a layer of elastic material adhering both to the reinforcement means and to the ring means.

4. A pipe according to claim 3, characterized in that the flange means is constituted by at least two ring means disposed adjacent to each other and connected by a common clamp means.

5. A pipe according to claim 4, characterized in that the flange portion of the reinforcement means is disposed between said at least two ring means.

6. A pipe according to claim 5, characterized is that the metallic element is elastically deformable.

7. A pipe according to claim 5, characterized in that axial holes for the passage of coupling bolts are provided in each of said at least two ring means, each hole being separated from the next adjacent hole by at least one clamp means.

8. A pipe according to claim 2, characterized in that an end of the reinforcement means is disposed between concentric windings of said element and is flanged over against a face of the coupling flange means.

9. A pipe according to claim 8 characterized in that substantially radially disposed clamp means encircle the windings of the said element and maintain the same firmly joined to one another.

10. A pipe according to claim 9, characterized in that axial holes for the passage of coupling bolts are provided in the ring means, each hole being separated from the next adjacent hole by at least one clamp means.

11. A pipe according to claim 9 characterized in that the flange means is constituted by two substantially concentric ring means separated from each other by an annular layer of elastic material in which are provided axial holes for the passage therethrough of bolts.

12. A pipe according to claim 2, characterized in that the metallic element is elastically deformable.

13. A pipe according to claim 1, characterized in that the reinforcement means includes a flange portion, said flange portion is disposed adjacent a face of the ring means and is connected thereto by way of a layer of elastic material adhering both to the reinforcement means and to the ring means.

14. A pipe according to claim 1, characterized in that an end of the reinforcement means is disposed between concentric windings of said element and is flanged over against a face of the coupling flange means.

15. A pipe according to claim 1, characterized in that the flange means is constituted by two substantially concentric ring means separated from each other by an annular layer of elastic material in which are provided axial holes for the passage therethrough of bolts.

16. A pipe according to claim 1, characterized in that the flange means is constituted by at least two ring means disposed adjacent to each other and connected together by common clamp means.

17. A pipe according to claim 1, characterized in that at least two ring means are provided and the reinforcement means is provided with a flange portion, said flange portion being disposed between said at least two ring means.

18. A pipe of rubber or analogous material, provided with a coupling flange means constituted by at least one ring means connected to reinforcement means of the pipe, characterized in that the ring means is constituted by at least one series of concentric windingss of an element wound along spirals superposed one upon the other and firmly joined with one another, and characterized in that the element is a steel ribbon.

19. A pipe of rubber or analogous material, provided with a coupling flange means constituted by at least one ring means connected to reinforcement means of the pipe, characterized in that the ring means is constituted by at least one series of concentric windings of an element wound along spirals superposed one upon the other and firmly joined with one another, and characterized in that the element is a metallic hooping material.

20. A pipe of rubber or analogous material, provided with a coupling flange means constituted by at least one ring means connected to reinforcement means of the pipe, characterized in that the ring means is constituted by at least one series of concentric windings of an element wound along spirals superposed one upon the other and firmly joined with one another; and in that the element is metallic, and characterized in that the reinforcement means is flanged over against a face of the ring means to which it is connected by way of a layer of elastic material adhering both to the reinforcement means and to the ring means, and characterized in that the elastic material is rubber.

21. A pipe of rubber or analogous material, provided with a coupling flange means constituted by at least one ring means connected to the reinforcement means of the pipe, characterized in that the ring means is constituted by at least one series of concentric windings of an element wound along spirals superposed one upon the other and firmly joined with one another, and characterized in that substantially radially disposed clamp means encircle the windings of said element and maintain the same firmly joined to one another.

22. A pipe of rubber or analogous material, provided with a coupling flange means constituted by at least one ring means connected to the reinforcement means of the pipe, characterized in that the ring means is constituted by at least one series of concentric windings of an element wound along spirals superposed one upon the other and firmly joined with one another, and characterized in that axial holes for the passage of coupling bolts are provided in the ring means, each hole being separated from the next adjacent hole by at least one clamp means.

* * * * *